United States Patent Office 2,876,189
Patented Mar. 3, 1959

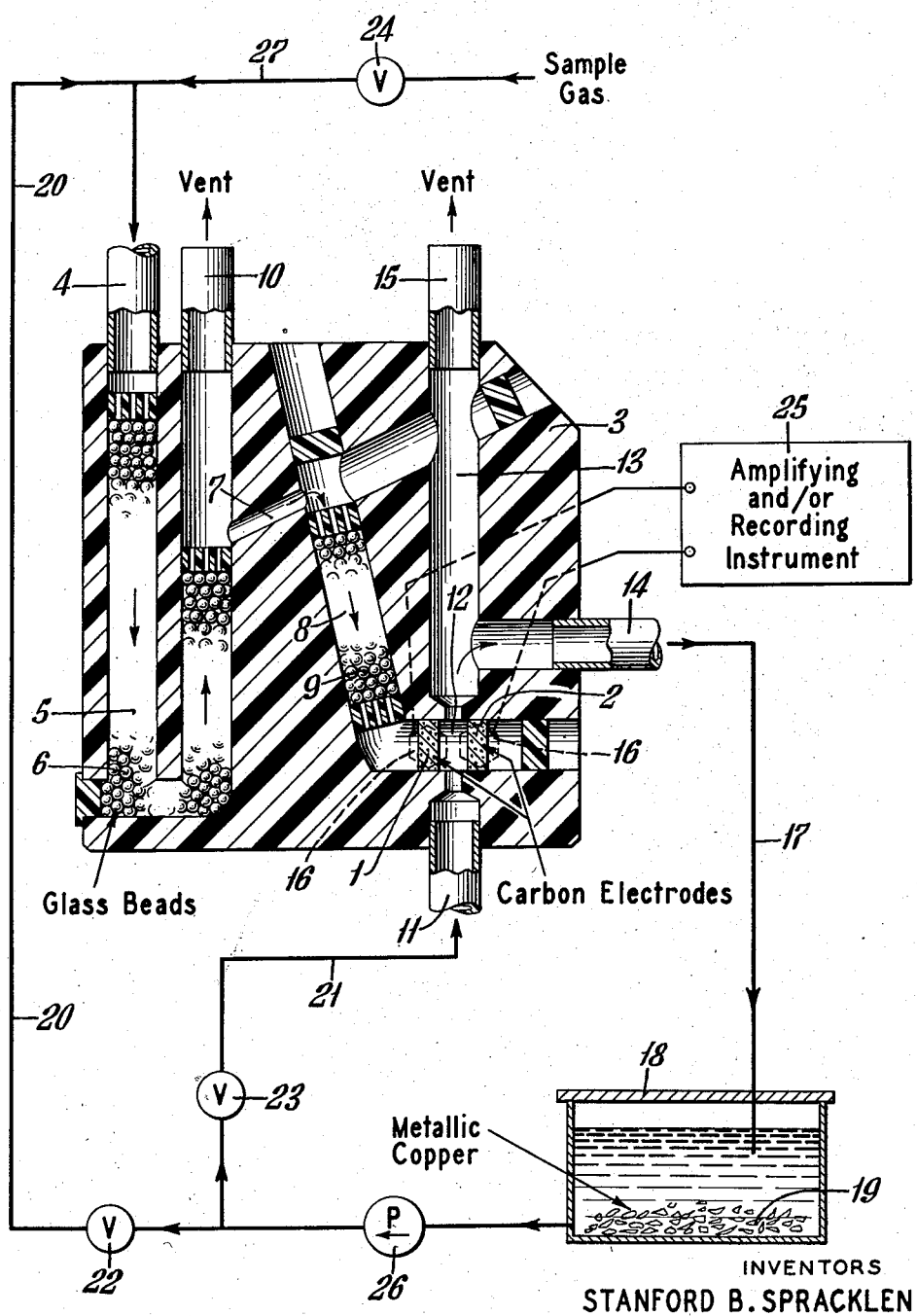

2,876,189

APPARATUS FOR ELECTROCHEMICAL FLUID ANALYSIS

Stanford B. Spracklen, Hurricane, Donald N. Campbell, St. Albans, and Charles G. Fellows, Charleston, W. Va., assignors to Union Carbide Corporation, a corporation of New York Application February 13, 1956, Serial No. 564,942

6 Claims. (Cl. 204—195)

The present invention relates to a method and apparatus for the continuous measurement of one constituent in a stream of process fluid, referred to hereinafter as the "sample fluid."

In the continuous analysis of constituents of a fluid mixture with an instrument having a full scale range of 100 parts per million, the problem of sorting out—and in some way tagging and counting—so few parts in so many becomes extremely difficult.

Heretofore, a method of analyzing sample fluids for detecting and quantitatively measuring for one constituent of a fluid mixture in the parts per million range has been proposed employing what may be referred to as the "concentration cell" principle. A concentration cell is one in which two bodies of electrolyte, one having an ionic content different from the other in magnitude and/or kind, are placed together so that a liquid interface obtains and an ionic gradient exists across this interface which causes an electrical potential to occur between two electrodes of the same material, one of which is contacted with each body of electrolyte. Most prior apparatus based on the concentration cell principle employed heretofore was not applicable to the continuous measurement for one constituent of a flowing sample fluid stream due to the difficulties encountered in maintaining a definite interface between the two electrolyte components of the cell. In those few prior apparatus proposed for continuous measurement, the requirement of maintaining a definite interface between the two electrolyte components of the cell was so critical that diffusion barriers, such as salt bridges, diaphragms, or the like, were required to properly separate the two electrolyte components. This resulted in low speed response and complicated apparatus.

Another prior method was proposed employing photochemical means for quantitatively measuring for one constituent of a sample fluid mixture. This method is disclosed and claimed in U. S. Patent application Serial No. 374,941 filed August 17, 1953 by S. B. Spracklen and C. G. Fellows and now abandoned. As disclosed therein, a method is provided for continuously analyzing for parts per million of oxygen in a sample fluid by measuring the relative change in turbidity effected in a reagent solution by chemical reaction with the oxygen contained in the sample gas. Although such method provided a continuous measurement of oxygen content in the parts per million range, it presented the difficulty of having an inherently slow response time. The measurement principle there involved required, for effective measurement, a high ratio of sample fluid flow to reagent solution flow which, in turn, necessitated a large liquid hold-up time and resulted in a slow speed of response of the analyzer. Accordingly, if rapid changes in oxygen gas content were effected in the sample fluid, an indication of such changes could not be made for a considerable time period after the change. This means that such a method and apparatus was limited in utility to use with systems in which only slow uniform changes or drifts occurred, and was not capable of use with systems which provided large, rapid changes in the sample fluid being measured for oxygen content.

It is, therefore, the prime object of the present invention to provide a method of and apparatus for the continuous detection and quantitative determination of one constituent in the parts per million range of a mixture of fluids, which method affords a rapid time response, and which apparatus is simple and rugged in construction.

Other aims and advantages of the invention will be apparent from the following description and appended claims.

In accordance with the method of the present invention, a stream of suitable reagent electrolyte solution is continuously contacted with a flowing stream of sample fluid mixture containing the constituent to be measured for, and this constituent operates to effect a change in the ionic content of the reagent electrolyte solution. The treated reagent electrolyte solution stream is then passed in contact with one of a pair of parallel, spaced electrodes, while another stream of untreated reagent electrolyte solution is concurrently passed in contact with the other of the electrodes so as to form and maintain an interface between the two flowing streams of electrolyte solution. In this manner, what may be termed a "dynamic concentration cell" is provided which results in the development across the electrodes of a potential which is proportional to the concentration in the sample fluid mixture of the constituent to be measured for. The electrodes employed should be composed of a material that does not react with the reagent electrolyte solution employed, nor with the constituent of the sample fluid mixture to be measured. Unless the electrode materials are inert to this extent, corrosion or other chemical reactions will result in erratic operation and a faulty measurement.

The reagent electrolyte solution employed must be selected in terms of the constituents of the sample fluid mixture and so as to be effected in ionic content only by the constituent to be measured for and not by the other constituents of the sample fluid mixture. For example, a solution of ammoniacal ammonium chloride containing cuprous ammonium ions may be employed as the reagent for quantitatively measuring the oxygen gas content of a sample fluid mixture not having other constituents capable of chemically reacting with that solution or capable of oxidizing the cuprous ammonium ions to cupric ions.

The hydrogen chloride content of a gas mixture can be removed from the mixture by scrubbing in water and the ionic difference between the water before and after scrubbing can be calibrated as the hydrogen chloride concentration of the sample gas mixture, provided that the sample gas mixture does not contain other ionizable constituents.

Carbon dioxide and other gases may be scrubbed from a gas mixture by employing a suitable scrubbing solution and a concentration measurement can be effected in accordance with the method of the invention. The method is, therefore, operable for a wide variety of concentration measurements.

Apparatus suitable for performing the method of the invention is shown in the drawing wherein the single figure is a combined sectional view of the measuring cell block and a schematic flow diagram of the entire apparatus.

The operation of the embodiment of the drawing will be described hereinbelow with respect to the analysis of a sample gas mixture for oxygen concentration in the parts per million range.

As there shown, two inert electrodes 1 and 2, of carbon or other suitable material, are arranged in cell block 3 which is composed of an inert material such as plastic. The oxygen-containing sample gas enters the cell block through inlet conduit 4, as does the untreated reagent electrolyte solution which comprises a solution of ammoniacal ammonium chloride containing cuprous ammonium ions. The sample gas and untreated reagent electrolyte streams pass through U-shaped scrubbing passage 5 which is filled with packing 6, such as glass beads. Both the reagent electrolyte solution stream and the sample oxygen-containing gas stream are flowing at a predetermined fixed rate and some of the cuprous ammonium ions will be oxidized in the U-shaped passage 5 to cupric ammonium ions, the number of which will be proportional to the concentration of oxygen in the gas stream, and to the solution and sample gas flow rate ratio. The as-treated reagent electrolyte solution then passes through passage 7, passage 8, containing packing 9 such as glass beads, and then through perforated or pervious electrode 1 to form one electrolyte of the concentration cell. The gaseous constituents of the sample gas stream, other than oxygen, are carried from passage 5 through scrubber outlet vent 10.

Another stream of untreated reagent electrolyte solution is introduced into the cell block 3 through conduit 11 and passes between electrodes 1 and 2, in contact with electrode 2 and the stream of treated reagent electrolyte passing from and past electrode 1, thereby forming a liquid interface and completing a dynamic concentration cell between electrodes 1 and 2. After passing through the space 12 between electrodes 1 and 2, the streams of treated and untreated reagent solution intermix in passage 13 and are carried from the cell block 3 through exit conduit 14 and line 17. Vent 15 provides means for passing, from passages 8 and 13, any of the sample gas not vented from the system through scrubber vent 10.

Thus, a potential is continuously developed by the dynamic concentration cell maintained between the electrodes 1 and 2 and is proportional to the oxygen concentration of the sample gas removed by the reagent electrolyte solution in scrubber section 5. This potential is measured between electrode contacts 16 which are connected either directly, or if desired, through amplifying means, to an indicating or recording instrument 25 which is calibrated to read in parts per million oxygen concentration.

For ease of fabrication, the large passages of the cell block are all of the same diameter and passage 8 is filled with a packing material, such as glass beads, simply to reduce the volume of treated reagent electrolyte solution employed, thereby increasing the speed of response to a change in the measuring reagent electrolyte solution.

The mixture of treated and untreated reagent electrolyte solution passed from the cell block 3 through conduit 14 and line 17 may flow into a reservoir 18 containing metallic copper 19 in the form of turnings of small pieces of scrap, which, upon contacting the cupric ions of the treated solution, causes them to be reduced to cuprous ions. In this manner, the entire solution is restored to the untreated condition (containing only cuprous ions) which may then be returned by pump 26 through lines 20 and 21 to inlet conduits 4 and 11, respectively, thereby permitting continuous oxygen gas analysis employing a closed reagent solution system. Flow control valves 22, 23 and 24 are respectively provided in the lines 20 and 21 as well as in the sample gas inlet line 27. Ammonia lost in the system may be replenished by continuous additions from an external supply (not shown) to the reservoirs or some other point in the closed liquid cycle.

The apparatus of the embodiment of the drawing may be employed for the continuous measurement of one constituent of a wide variety of sample fluids by merely changing the selection of reagent electrolyte solution, since the apparatus has construction materials such as plastic, glass, and carbon which are inert to most solutions, both organic and inorganic.

What is claimed is:

1. Apparatus for continuously measuring the concentration of a selected constituent in a sample fluid mixture stream which comprises, cell block means having a packed scrubber section for contacting streams of reagent electrolyte solution and said sample fluid mixture to effect a change in ionic content of said reagent electrolyte solution proportional to the concentration of said selected constituent in the sample fluid mixture; conduit means for venting from said scrubber section the gaseous constituents of said sample fluid stream other than said selected constituent; a pair of solid electrodes having opposed surfaces in spaced, substantially parallel, relationship being of such composition that they react with neither the electrolyte nor the sample fluid; conduit means for passing said stream of as-treated reagent electrolyte solution from said scrubber section through and in contact with one of said electrodes, said electrode being porous; conduit means for passing a stream of untreated reagent electrolyte solution between said electrodes and in contact with the other of said electrodes so as to form a liquid interface between said streams and provide a dynamic concentration cell; and electric circuit indicating means, connected to said electrodes, responsive to the potential developed across said electrodes, and calibrated to indicate the change in concentration of said selected constituent of said sample fluid.

2. Apparatus for continuously measuring the concentration of a selected constituent in a sample fluid mixture stream which comprises, cell block means having a packed scrubber section for contacting streams of reagent electrolyte solution and said sample fluid mixture to effect a change in ionic content of said reagent electrolyte solution proportional to the concentration of said selected constituent in the sample fluid mixture; conduit means for venting from said scrubber section the gaseous constituents of said sample fluid stream other than said selected constituent; a pair of solid electrodes having opposed surfaces in spaced, substantially parallel, relationship being of such composition that they react with neither the electrolyte nor the sample fluid; conduit means for passing said stream of as-treated reagent electrolyte solution from said scrubber section through and in contact with one of said electrodes, said electrode being porous; conduit means for passing a stream of untreated reagent electrolyte solution between said electrodes and in contact with the other of said electrodes so as to form a liquid interface between said streams and provide a dynamic concentration cell; electric circuit indicating means, connected to said electrodes, responsive to the potential developed across said electrodes, and calibrated to indicate the change in concentration of said selected constituent of said sample fluid; means for effecting regeneration of said treated reagent electrolyte solution; and conduit means for recycling said regenerated reagent electrolyte solution to said cell block means.

3. In an apparatus for continuously measuring the concentration of a selected constituent of a sample fluid employing a concentration cell and means for reacting one portion of the electrolyte utilized in said cell with the sample fluid to achieve an ionic unbalance in that portion of the electrolyte which is proportional to said concentration, the improvement comprising two solid electrodes positioned within cavity means having opposed surfaces in spaced, substantially parallel, relationship, the first of said electrodes being porous for passing a continuous flow of treated electrolyte through said electrode and across the exposed face thereof; second inlet means opening adjacent to said second electrode for passing a continuous flow of untreated electrolyte in contact with the exposed face of said second electrode; third conduit means communicating with said cavity means for removing reacted and unreacted electrolyte from said cavity, the positioning of said conduit means and the fluid flow resulting in a dynamic liquid interface between said reacted and said unreacted electrolytes whereby an operative concentration cell and a potential difference is developed between said electrodes which is proportional to the ionic unbalance between the two electrolytes.

4. Apparatus for measuring a sample fluid which comprises, means for contacting streams of reagent electrolyte solution and said sample fluid to effect a change in ionic content of said reagent electrolyte solution; a pair of electrodes having opposed surfaces in spaced, substantially parallel, relationship and of such composition that they react with neither the electrolyte nor the sample fluid; conduit means for passing said stream of as-treated reagent electrolyte solution from said contacting means through and in contact with one of said electrodes, said electrode being porous; conduit means for passing a stream of untreated reagent electrolyte solution between said electrodes and in contact with the other of said electrodes so as to form a liquid interface between said streams and provide a dynamic concentration cell; and electric circuit indicating means connected to said electrodes, responsive to the potential developed across said electrodes.

5. Apparatus for continuously measuring the concentration of a selected constituent in a sample fluid mixture which comprises, means for contacting a stream of reagent electrolyte solution and said sample fluid mixture to effect a change in ionic content of said reagent electrolyte solution proportional to the concentration of said selected constituent in the sample fluid mixture; a pair of electrodes having opposed surfaces in spaced, substantially parallel, relationship and of such composition that they react with neither the electrolyte nor the sample fluid; conduit means for passing said stream of as-treated reagent electrolyte solution from said contacting means through and in contact with one of said electrodes, said electrode being porous; conduit means for passing a stream of reagent electrolyte solution between said electrodes and in contact with the other of said electrodes so as to form a liquid interface between said streams and provide a dynamic concentration cell; and electric circuit indicating means connected to said electrodes, responsive to the potential developed across said electrodes, and calibrated to indicate the change in concentration of said selected constituent of said sample fluid.

6. Apparatus for continuously measuring the concentration of a selected constituent in a sample fluid mixture which comprises, means for contacting a stream of reagent electrolyte solution and said sample fluid mixture to effect a change in ionic content of said reagent electrolyte solution proportional to the concentration of said selected constituent in the sample fluid mixture; a pair of electrodes having opposed surfaces in spaced, substantially parallel, relationship and of such composition that they react with neither the electrolyte nor the sample fluid; conduit means for passing a stream of untreated reagent electrolyte solution through and in contact with one of said electrodes, said electrode being porous; conduit means for passing said stream of as-treated reagent electrolyte solution from said contacting means between said electrodes and in contact with the other of said electrodes so as to form a liquid interface between said streams and provide a dynamic concentration cell; and electric circuit indicating means connected to said electrodes, responsive to the potential developed across said electrodes, and calibrated to indicate the change in concentration of said selected constituent of said sample fluid.

References Cited in the file of this patent

UNITED STATES PATENTS

| | | |
|---|---|---|
| 1,970,342 | Schlumberger | Aug. 14, 1934 |
| 2,278,248 | Darrah | Mar. 31, 1942 |
| 2,289,610 | Wallace | July 14, 1942 |
| 2,382,381 | Calvert et al. | Aug. 14, 1945 |
| 2,517,382 | Brinker et al. | Aug. 1, 1950 |

FOREIGN PATENTS

| | | |
|---|---|---|
| 768,577 | France | May 22, 1934 |

OTHER REFERENCES

Article by MacHattie et al., Industrial Engineering Chemistry (Analytical ed.), vol. 9, August 15, 1937, pp. 364–366.